United States Patent Office 3,734,747
Patented May 22, 1973

---

3,734,747
AEROSOL COLOR MIXTURE AND METHOD OF MAKING SAME
David F. De Felice, 45 Mount Pleasant Ave.,
Stratford, Conn. 06497
No Drawing. Filed Oct. 1, 1970, Ser. No. 77,366
Int. Cl. A23l *1/26*
U.S. Cl. 99—148 R                    12 Claims

ABSTRACT OF THE DISCLOSURE

An aerosol color concentrate for thin film color coating which contains dextrine, deionized water, propylene glycol, an organic dye, sodium benzoate and citrate and a drying agent. The concentrate is stable under pressurized as well as atmospheric conditions and does not precipitate dextrin.

PRIOR ART AND PROBLEM

There is not known, to my knowledge, a product which can be or is capable of being satisfactorily packaged in a pressurized container from which it can be applied in the form of an aerosol spray to color various food products or comestibles, such as cakes, pies, cookies and the like, or which can also be applied to color or paint other non food articles such as toys and the like. Many kinds of paints and other products are known to have been packaged in pressurized cans from which they can be sprayed or aerosol dispensed, but such prior known aerosols were incapable of being used to color food products because of the toxic and poisonous ingredients generally contained therein.

In the formulation of a concentrate which can be rendered suitable for coloring both food products as well as non food products, the problem of product stability becomes paramount. It has been discovered that a product of the type disclosed herein must be capable of having two distinct stabilities, i.e., the combination of ingredients has to be sufficiently compatible so as to render the concentrate or mixture stable at atmospheric pressure during the initial formulation. Also the mixture thereafter has to be capable of achieving long term stability under pressure so as to be capable of maintaining a satisfactory long shelf life.

The stability requirements of a product of the type herein disclosed, therefore, are believed to be one of the reasons why such a product has not been heretofore achieved.

OBJECTS

It is an object of this invention to provide a formulation for a product formed of non-toxic ingredients that can be readily aerosoled for coloring either food articles and/or nonfood articles.

Another object is to provide a method of formulating a coloring concentrate comprising of non-toxic ingredients that is rendered stable under atmospheric conditions.

Another object is to provide an article of manufacture in which a non-toxic food coloring and/or flavoring concentrate is maintained under pressure in a valved pressurized container from which the concentrate is dispensed in an aerosol mist or spray to form a thin film color layer.

BRIEF SUMMARY OF THE INVENTION

The foregoing objects, features and other advantages are attained by a coloring concentrate comprising of the addition of dextrin to water in prescribed predetermined amounts in a manner to assure total solubilization of the dextrin. A glycol solvent and stabilizer for both food flavor and color, e.g. a propylene glycol is added next. Sodium benzoate in conjunction with sodium citrate is added to enhance the long term stability of the final product. A suitable coloring or organic dye and/or flavoring is added to the mixture. A denatured alcohol is added to the mixture to provide a vehicle to promote fast drying of the end product upon the dispensing thereof.

The mixture described is placed in a pressurized container which is sealed by a dispensing valve, and the mixture comprising the contents of the sealed can is pressurized by a propellant, e.g. an isobutane (2-methyl propane gas).

FEATURES

A feature of this invention resides in the provision of a food coloring concentrate in which a dextrin tie in with a suitable color or dye is mixed with a highly volatile carrier in a solution maintained under pressure so as to enable the dextrin to be dispensed in a fine spray or mist to form a thin, non-toxic color film on a food product which can be readily consumed.

Another feature resides in the provision of a food coloring concentrate which is rendered initially stable so that it can be properly packaged under pressure in an aerosol type can dispenser and which is also capable of being maintained in a stable condition under pressure for a considerable period of time.

Other features and advantages will become more readily apparent when considered in view of the more detailed following description.

DETAILED DESCRIPTION

The color mixture herein described comprises a non-toxic concentrate which when pressurized in an aerosol type container can be sprayed in the form of a fine mist to color either various food products, e.g. cakes, pies, cookies and the like, or in the alternative may be used as a paint product to color or paint pictures, toys and various other non-food products. The color mixture is non-toxic and completely harmless. For this reason it is particularly useful as a simple and expedient means to add flavor and/or appeal to various food products.

The composition comprises a dextrin, e.g. a tapioca starch derivative mixed in water at room temperature in predetermined amounts. Preferably deionized water is recommended for optimum results. The mixture of dextrin to the water is carried out slowly to promote total solubilization of the dextrin.

A glycol solvent and stabilizer, e.g. propylene glycol is next added to the dextrin solution. To this is added sodium benzoate and sodium citrate. The sodium benzoate and sodium citrate, which function as a rust inhibitor by minimizing oxidation, are added as the resulting batch is agitated to insure that both are equally dissolved. The dye is then added. It will be understood that the dyes may be any of the FD&C colors, e.g. of the type manufactured by H. Kohnstomn Company. If a flavoring is used, it is preferred that the flavoring be added to the batch before the dye. It will be understood that any suitable flavoring may be used to achieve the desired taste. The batch so formed is agitated well to insure proper commingling of the ingredients.

To this batch, which may be defined as the super concentrate, there is added a predetermined amount of denatured alcohol. The denatured alcohol provides the vehicle to promote the fast drying of the product as it is released from the aerosol can as will be hereinafter set forth. The denatured alcohol utilized may be of the SDA 23A or SDA 35A type.

The concentrate so formed, i.e. the super concentrate and the alcohol mixed therewith is metered in predetermined amounts into the dispensing can. The can with the properly proportioned concentrate contained therein is then capped and sealed with an appropriate dispensing valve. The can and its contents of the concentrate is then pressurized by introducing thereinto a propellant, e.g., 2-methyl propane ($C_4H_{10}$).

The manner described above may be considered as a batch method of forming the concentrate. However because there may be some tendency of the dextrin to precipitate out because it is not soluble in alcohol, it is preferred that the required amount of alcohol be added after the requisite amount of super concentrate mix has been placed in the individual containers, and just prior to capping and sealing of the individual dispensing container. Mixing of the alcohol and the super concentrate is thus effected within the respective cans by the agitating created within the can when the propellant is added. Upon completion of the can pressurization step, the product within the can is fixed and rendered stable for a considerable period of time.

This latter described method may be termed as the "alcohol drop" method, as distinguished from the batch method hereinbefore described. The alcohol drop method described is advantageous in that it will minimize any tendency of the dextrin to precipitate out of solution before it becomes fixed. With this method it is possible to increase the amount or percentage of dextrin which may be placed in solution and which will enhance the results attained.

The following are a number of specific formulations which were made in accordance with the methods hereinabove described.

BLUE CONCENTRATE OR COLOR MIXTURE WITHOUT FLAVOR

| | Percent in— | |
|---|---|---|
| | Formula | Concentrate |
| $H_2O$ deionized | 28.595 | 37.695 |
| SDA 35-A (200 proof) | 46.645 | 61.489 |
| Dextrin 14-R (fine) | 0.350 | 0.461 |
| Sodium benzoate (USP) | 0.060 | 0.079 |
| Sodium citrate (USP) | 0.040 | 0.053 |
| Propylene glycol | 0.130 | 0.171 |
| FD&C—Yellow #5 | 0.033 | 0.043 |
| FD&C—Green #3 | 0.007 | 0.009 |
| Isobutane (aero. grade) | 24.140 | |
| Total | 100.000 | 100.000 |

BLUE CONCENTRATE OR COLOR MIXTURE WITH (SPEARMINT)

| | Percent in— | |
|---|---|---|
| | Formula | Concentrate |
| $H_2O$ deionized | 28.595 | 37.498 |
| SDA 35-A (200 proof) | 46.645 | 61.167 |
| Dextrin 14-R (fine) | 0.350 | 0.459 |
| Sodium benzoate (USP) | 0.060 | 0.078 |
| Sodium citrate (USP) | 0.040 | 0.052 |
| Propylene glycol | 0.130 | 0.170 |
| FD&C—Yellow #5 | 0.033 | 0.043 |
| FD&C—Green #3 | 0.007 | 0.009 |
| Spearmint flavor #M-1124-C | 0.400 | 0.524 |
| Isobutane (aero. grade) | 23.740 | |
| Total | 100.000 | 100.000 |

YELLOW CONCENTRATE OR COLOR MIXTURE WITHOUT FLAVOR

| | Percent in— | |
|---|---|---|
| | Formula | Concentrate |
| $H_2O$ deionized | 28.595 | 37.695 |
| SDA 23-A (200 proof) | 46.645 | 61.488 |
| Dextrin 14-R (fine) | 0.350 | 0.461 |
| Sodium benzoate (USP) | 0.060 | 0.079 |
| Sodium citrate (USP) | 0.040 | 0.053 |
| Propylene glycol | 0.130 | 0.171 |
| FD&C—Yellow #5 | 0.040 | 0.053 |
| Isobutane (aero. grade) | 24.140 | |
| Total | 100.000 | 100.000 |

YELLOW CONCENTRATE OR COLOR MIXTURE WITH FLAVOR (PINEAPPLE)

| | Percent in— | |
|---|---|---|
| | Formula | Concentrate |
| $H_2O$ deionized | 28.595 | 37.498 |
| SDA 23-A (200 proof) | 46.645 | 61.167 |
| Dextrin 14-R (fine) | 0.350 | 0.459 |
| Sodium benzoate (USP) | 0.060 | 0.078 |
| Sodium citrate (USP) | 0.040 | 0.052 |
| Propylene glycol | 0.130 | 0.170 |
| FD&C—Yellow #5 | 0.040 | 0.052 |
| Pineapple flavor #826 | 0.400 | 0.524 |
| Isobutane (aero. grade) | 23.740 | |
| Total | 100.000 | 100.000 |

RED CONCENTRATE OR COLOR MIXTURE WITHOUT FLAVOR

| | Percent in— | |
|---|---|---|
| | Formula | Concentrate |
| $H_2O$ deionized | 28.595 | 37.685 |
| SDA 35-A (200 proof) | 46.645 | 61.472 |
| Dextrin 14-R (fine) | 0.350 | 0.461 |
| Sodium benzoate (USP) | 0.060 | 0.079 |
| Sodium citrate (USP) | 0.040 | 0.053 |
| Propylene glycol | 0.130 | 0.171 |
| FD&C—Red #2 | 0.060 | 0.079 |
| Isobutane (aero. grade) | 24.120 | |
| Total | 100.000 | 100.000 |

RED CONCENTRATE OR COLOR MIXTURE WITH FLAVOR (CHERRY)

| | Percent in— | |
|---|---|---|
| | Formula | Concentrate |
| $H_2O$ deionized | 28.595 | 37.487 |
| SDA 35-A (200 proof) | 46.645 | 61.150 |
| Dextrin 14-R (fine) | 0.350 | 0.459 |
| Sodium benzoate (USP) | 0.060 | 0.079 |
| Sodium citrate (USP) | 0.040 | 0.052 |
| Propylene glycol | 0.130 | 0.170 |
| FD&C—RED #2 | 0.060 | 0.079 |
| Cherry flavor #62242 | 0.400 | 0.524 |
| Isobutane (aero. grade) | 23.720 | |
| Total | 100.000 | 100.000 |

GREEN CONCENTRATE OR COLOR MIXTURE WITHOUT FLAVOR

| | Percent in— | |
|---|---|---|
| | Formula | Concentrate |
| $H_2O$ deionized | 28.595 | 37.703 |
| SDA 35-A (200 proof) | 46.645 | 61.500 |
| Dextrin 14-R (fine) | 0.350 | 0.461 |
| Sodium benzoate (USP) | 0.060 | 0.079 |
| Sodium citrate (USP) | 0.040 | 0.053 |
| Propylene glycol | 0.130 | 0.171 |
| FD&C—Green #3 | 0.025 | 0.033 |
| Isobutane (aero. grade) | 24.155 | |
| Total | 100.000 | 100.000 |

GREEN CONCENTRATE OR COLOR MIXTURE WITH FLAVOR (RASPBERRY)

| | Percent in— | |
|---|---|---|
| | Formula | Concentrate |
| $H_2O$ deionized | 28.595 | 37.504 |
| SDA 35-A (200 proof) | 46.645 | 61.178 |
| Dextrin 14-R (fine) | 0.350 | 0.459 |
| Sodium benzoate (USP) | 0.060 | 0.079 |
| Sodium citrate (USP) | 0.040 | 0.052 |
| Propylene glycol | 0.130 | 0.171 |
| FD&C—GREEN #3 | 0.025 | 0.033 |
| Raspberry flavor #M-174-B | 0.400 | 0.524 |
| Isobutane (aero. grade) | 23.755 | |
| Total | 100.000 | 100.000 |

It will be understood that the foregoing formulations are exemplary of the many different formulations possible, and that the formulations may vary in proportion to the number of different available dye colors and/or flavors.

It is also possible that a fragrance may be substituted in lieu of a flavor. For example the formulation may be scented with a desired fragrance. In such cases the formulation may be utilized to color artificial flowers, in which case a flower so colored is scented to give off its characteristic smell or fragrance.

From the foregoing it will be noted that the color concentrate is formed of non-toxic ingredients which can be rendered readily edible with the food product to be colored and/or flavored, e.g. cake, cookies, ice cream, etc. More important the color concentrate can be easily dispensed in the form of a spray or mist wherein the dextrin causes a thin film to be adhesively secured to the article to be colored. The concentrate is also adaptable for coloring and/or painting non food articles, thereby making it an ideal coloring material for use by small children. It may be used in paint sets used by children to paint either food products and/or non-food products.

The product formulations herein described are rendered stable for considerable periods of time, thereby insuring long shelf life.

While the invention has been described with respect to several embodiments thereof, it will be appreciated that variations and modifications may be formed without departing from the spirit or scope of the invention.

What is claimed is:

1. A method of making coloring non-toxic concentrate for dispensing through an aerosol comprising the steps of:
mixing dextrine ranging between .459 to .461% with deionized water ranging between 37.487 to 37.703% so as to permit total solubilization of the dextrin,
adding propylene glycol ranging between .170 to .171% to the batched dextrin solution to stabilize the solution,
thereafter adding sodium benzoate ranging between 0.78 to .079% and sodium citrate ranging between .052 to .053% to the batch until dissolved,
an organic dye of desired color is then mixed to the batch, and denatured alcohol ranging between 61.150 to 61.500% as a drying agent is then added to the concentrate said percentages being based on the total concentrate.

2. The invention as defined in claim 1 wherein a flavoring material is added to the concentrate.

3. The method as defined in claim 1 wherein said concentrate is disposed in an aerosol type can container,
capping the container with a dispensing valve,
and pressurizing said concentrate within said container by adding a propellant thereto,
said propellant comprising 23.720 to 24.155% of the container contents.

4. The invention as defined in claim 3 wherein said propellant comprises 2-methyl propane ($C_4H_{10}$).

5. An article of manufacture comprising an aerosol type can container,
a dispensing valve connected to said container,
and said container containing a mixture comprising a solution of deionized water ranging between 37.487 to 37.703% and dextrin, ranging between .459 to .461%,
a rust inhibitor including sodium benzoate ranging between .078 to .079% and sodium citrate ranging between .052 to .053% mixed in said solution,
an organic dye,
propylene glycol ranging between .170 and .171% for tying in said dextrin and dye in suspension within said solution,
denatured alcohol in the range between 61.150 to 61.500% mixed with said solution,
and propellant ranging between 23.740 and 25.155% for maintaining said solution under pressure within said container,
said propellant comprising 2-methyl propane, said percentages being based on the total concentrate.

6. The invention defined in claim 5 and including a flavoring material in said solution.

7. A method of making a non-toxic coloring concentrate which can be dispensed from an aerosol comprising the steps of
dissolving dextrin ranging between .459 to .461% in deionized water ranging between 37.487 to 37.703%,
mixing .170 to .171% of propylene glycol to the dextrin solution to stabilize the solution,
dissolving between .078 to .079% of sodium benzoate and between .052 to .053% sodium citrate into the dextrin and propylene glycol solution,
and an organic dye of desired color is added to the solution to form the coloring concentrate,
placing said concentrate into an aerosol type can container from which it is to be dispensed,
dropping into said container a 61.150 to 61.500% drying agent,
capping the container with a dispensing valve, and
thereafter pressurizing said container by injecting 23.720 to 24.155% propellant thereinto, said percentages being based on the total concentrate.

8. The method as defined in claim 7 wherein a desired flavoring is added to the concentrate.

9. The invention as defined in claim 7 wherein said drying agent comprises denatured alcohol.

10. The invention as defined in claim 9 wherein said propellant comprises 2-methyl propane.

11. The method as defined in claim 7 wherein said dextrin solution is formed by slowly dissolving approximately .459 part of dextrin to 37.498 parts of deionized water.

12. The invention as defined in claim 11 utilizing a combination of sodium benzoate and sodium citrate as the rust inhibitor.

References Cited

UNITED STATES PATENTS

| | | | |
|---|---|---|---|
| 3,347,682 | 10/1967 | Rosenstein | 99—148 R |
| 3,547,854 | 12/1970 | Strengelbach | 106—213 |

FOREIGN PATENTS

| | | | |
|---|---|---|---|
| 897,258 | 5/1962 | Great Britain | 99—189 |

OTHER REFERENCES

Film Coating of Tablets, Warner-Jenkinson Mfg. Co., St. Louis, Mo., 1969, pp. 2 and 4.

Certified Food Colors, Warner-Jenkinson Mfg. Co., St. Louis, Mo., 1969, pp. 15–17.

Whistler: Industrial Gums, Academic Press, New York, 1959, pp. 718, 722–723.

A. LOUIS MONACELL, Primary Examiner

J. M. HUNTER, Assistant Examiner

U.S. Cl. X.R.

99—189